United States Patent [19]
Moudgill

[11] Patent Number: 6,032,244
[45] Date of Patent: Feb. 29, 2000

[54] MULTIPLE ISSUE STATIC SPECULATIVE INSTRUCTION SCHEDULING WITH PATH TAG AND PRECISE INTERRUPT HANDLING

[75] Inventor: Mayan Moudgill, Ithaca, N.Y.

[73] Assignee: Cornell Research Foundation, Inc., Ithaca, N.Y.

[21] Appl. No.: 08/000,342

[22] Filed: Jan. 4, 1993

[51] Int. Cl.[7] .................................................. G06F 9/38
[52] U.S. Cl. ........................ 712/23; 712/215; 712/244; 712/245
[58] Field of Search .................................. 395/375, 700, 395/650; 712/23, 215, 244, 245

[56] References Cited

U.S. PATENT DOCUMENTS

| | | | |
|---|---|---|---|
| 5,072,364 | 12/1991 | Jardine et al. | 712/215 |
| 5,127,091 | 6/1992 | Boufarah et al. | 712/238 |
| 5,226,126 | 7/1993 | McFarland et al. | 712/218 |
| 5,257,354 | 10/1993 | Comfort et al. | 714/16 |

OTHER PUBLICATIONS

Smith, Jane E. et al "Implementing Precise Interrupts in Pipeline Processors" IEEE Transaction on Computers, vol. 37, No. 5, May 1988.

Ebcioglu, Kemal "Some design ideas for a VLIW architecture for sequential natured software" Apr. 1988 Parallel Processing Elsevier Science Publishers (North–Holland).

Smith, Michael D. et al "Boosting Beyond Static Scheduling in a Superscalar Processor" (IEEE) May 1990 Proceedings on 17th Internation Symposium on Computer Architecture.

Mahlke, Scott A. et al "Sentinel Scheduling for VLIW and Superscalar Processors" ACM 1992.

*Primary Examiner*—Kenneth S. Kim
*Attorney, Agent, or Firm*—Salzman & Levy

[57] ABSTRACT

The present invention features a computer with a mechanism for implementing precise interrupts for statically speculated instructions. One or more assumptions are generated, and all instructions in each assumption are tagged identically and statically scheduled on a speculative basis. An instruction is then modified or inserted at one or more decision points prior to the point at which the instruction was speculated. The decision points may be positive ones (the instructions scheduled under that assumption have succeeded) or negative ones (the instructions scheduled under that assumption have failed), or both. A decision point may be positive for one assumption and negative for another assumption. Static speculation may be performed down both sides of branches and may be performed simultaneously for multiple, independent paths. Efficient restart can also be effected.

7 Claims, 12 Drawing Sheets

MULTIPLE ISSUE STATIC SPECULATIVE INSTRUCTION SCHEDULING WITH PATH TAG AND PRECISE INTERRUPT HANDLING

BACKGROUND OF THE INVENTION

The present invention pertains to techniques for implementing static speculative instructions and, more particularly, to an architecture for scheduling groups of speculative instructions to be issued and for enabling multiple-issue, static speculation.

Superscalar processors are uniprocessor organizations that are capable of increasing machine performance by executing multiple scalar instructions in parallel. Since the amount of instruction-level parallelism (ILP) within a basic block is small, superscalar processors must look across basic block boundaries to increase performance. Unfortunately, many of the branches in non-numerical code are data-dependent and cannot be resolved early. Thus, speculative execution—the execution of operations before unresolved previous branches, is an important source of parallelism in this type of code.

Instruction-level parallelism can be extracted statically (at compile-time) or dynamically (at run-time). Statically-scheduled instruction level parallelism processors, such as Very Long Instruction Word (VLIW) machines, exploit instruction-level parallelism with a modest amount of hardware by exposing the machine's parallel architecture in the instruction set. For numerical applications, where branches can be determined early, compilers harness the parallelism across basic blocks by utilizing techniques such as software pipelining or trace scheduling. However, the overhead and complexity of speculative computation in compilers have prevented efficient parallelization of non-numerical code.

Dynamically-scheduled superscalar processors, on the other hand, effectively support speculative execution in hardware. By using simple buffers, these processors can efficiently commit or discard the side effects of speculative computation. Unfortunately, the necessary additional hardware to look far ahead in the dynamic instruction stream, find independent operations and schedule these independent operations out of order is costly and complex.

Recent studies have shown that multiple-issue processors will rarely achieve speed-ups exceeding a factor of two over pipelined architectures, without some degree of speculation. With speculation, speed-ups ranging from a factor of three to six are possible. Also, further speed-up is possible if speculation is performed simultaneously on multiple paths.

Dynamic speculation, as implemented by superscalar architectures, can achieve speed-ups of approximately a factor of three. However, because of the complexity of the dynamic scheduler (the dispatch mechanism), it is unlikely that performance will improve much beyond this number.

However, a Very Large Instruction Word (VLIW) Computer implementing static, rather than dynamic, speculation, could avoid this complexity by scheduling ahead of time, at compile-time. Such an architecture is capable of achieving speed-ups greater than a factor of three.

Moreover, although dynamic speculation down multiple paths requires a prohibitively great amount of hardware, static speculation can exploit multi-path speculation without requiring a significant amount of additional hardware.

An instruction is considered to be issued speculatively, if it is not known at the time of issue whether the instruction should have been issued. Translated code running on statically-scheduled architecture must report traps (e.g., divide by zero, overflow, etc.) exactly as would the original code if processed in order (non-speculatively). This definition becomes clearer if a transformation such as the one in Sequence A is considered.

```
L0:                              L0:
     branch . . .        I0*:        r7 = r1 * r9
L1:                                   branch . . .
     branch . . .  ==>   L1:
                                      branch . . .
L2:
I0:     r7 = r1 * r9             L2:
Original non-speculative    transformed Speculative
         Sequence A: Speculation of instructions
```

The instruction I0 should have been issued in basic block L2. However, it was speculatively issued in block L0. Issuing an instruction speculatively involves moving it past one or more branches. An instruction that was moved past a branch is said to have been speculated past the branch. The original position of the instruction in the sequential program is called its "origin point". The position at which the instruction is issued speculatively is its "issue point".

During execution, an instruction "fails" at a branch if it was speculated past it, and the branch takes a direction not leading to the origin point of the instruction. Otherwise it is said to have "succeeded" at the branch. An instruction succeeds if it succeeds at all branches (i.e., the program actually executes the basic block in which the origin point lies). The instruction fails if it fails at any branch. The instruction is "resolved" if it either succeeds or fails.

Consider the division of instruction execution into two stages: compute and register update. Instruction issue and the calculation of the results are performed during the compute stage. During the update stage, the user-visible state of the registers is modified to reflect the results, and any trap (i.e., error) that occurred is reported. The term "state" or "machine state" includes the program counter, the registers and the memory. In this context, the intent of speculation is to perform the compute stage early, but delay the update stage until it is known that the instruction would have been executed (i.e., that no errors or traps occurred during its or some prior instruction's execution, and that instruction succeeds).

A "speculative instruction", in mechanisms proposed to implement static speculation, performs only the compute stage. Such a speculative instruction computes the result; it does not report any trap that occurred during the calculation, but merely buffers it. Another instruction actually performs the update stage for the speculative instruction. This instruction may perform multiple updates for several speculative instructions simultaneously. It will report any previously buffered trap. If the mechanism buffers results, it will update the register (i.e., the user-visible state) with these results.

If a speculative instruction encounters a trap during its execution, it is said to have "trapped", even though the trap will not be reported until later, if at all. The point at which the update for a previously issued speculative instruction occurs is known as the "commit point"; the instruction which causes the update is known as its "commit instruction". The commit point is usually in the same basic block as the origin point. Thus, a speculative instruction is said to succeed if its commit instruction is executed.

Merely reporting interrupts (i.e., traps) is not enough. The interrupt and the machine state at the time that it is reported must provide enough information for the user to determine the cause of the trap and, possibly, to resume execution after correcting the cause. In sequential processor architectures that have no static speculation, the commonly used model for reporting interrupts is the precise interrupt model. Precise interrupts facilitate debugging and restarting a program after an interrupt.

An interrupt is precise if, at the time it is reported to the user, the machine state reflects the following conditions:

a) the program counter points to the instruction which caused the trap; and b) all instructions that preceded the trapping instruction in the program have executed without a trap and have correctly modified the state; and c) all instructions succeeding the trapping instruction are unexecuted and have not modified the state.

An instruction that is issued speculatively may trap. This trap cannot be reported until it is known that the instruction would have executed. Thus, a scheme must delay reporting traps caused by speculative instructions, but should permit such traps to be determined and reported later. Typically, such a scheme involves a cooperative effort of both hardware and software, adding hardware to enable delayed interrupt reporting, and requiring the software be written so as to ensure that the interrupts are reported correctly.

Detecting traps is not sufficient. In many cases, it may be important to modify the state, with a technique called "restarting". In speculative architectures, speculative instructions must then be re-executed if they have been issued but not yet resolved (succeeded or failed), using this modified state.

Two major schemes for static speculation are those known as "boosting" and "poison-bit". The poison-bit scheme has been described in "Some Design Ideas for a VLIW Architecture for Sequential Natured Software", by Kemal Ebcioglu in *Parallel Processing*, pp. 3–21, April, 1988. A structured way of compiling, for this class of architectures, called sentinel scheduling, is described in "Sentinel Scheduling for VLIW and Superscalar Processors", by Scott A. Mahlke et al., Fifth International Symposium on Architectural Support for Programming Languages and operating Systems, 1992.

Briefly, each register has an extra bit, known as the poison bit. If a speculative instruction traps, then its destination register is poisoned (i.e., the poison bit is set). Should another speculative instruction read a poisoned register, then its destination register is also poisoned. When a non-speculative instruction reads a poisoned register, it signals a trap. Writing to a register clears the poison bit, if it had been set.

This scheme automatically delays reporting traps caused by speculative instructions. Reading the destination register of a speculative instruction can be used to determine whether that instruction trapped.

Boosting was first introduced in "Boosting Beyond Static Scheduling in a Superscalar Processor", by Michael D. Smith et al., in Proceedings of the 17th Annual International Symposium on Computer Architecture, pp. 344–354, May, 1990.

An instruction that is to be executed speculatively is labelled with the number of branches it was moved past. For example, in Sequence B, instructions I0 and I1 are moved past one branch each; so each is labelled with a "0.1". Instruction I2, which was moved past two branches, is labelled "0.2".

| L0: | | | L0: | |
|---|---|---|---|---|
| | branch . . . | | I0*: | r1.1 = r2 & r3 |
| L1: | | | I2*: | r7.2 = r8 * r9 |
| I0: | r1 = r2 & r3 | ==> | | branch . . . |
| | branch . . . | | L1: | |
| L2: | | | I1*: | r4.1 = r1 + r6 |
| I1: | r4 = r5 + r6 | | | branch . . . |
| I2: | r7 = r1 * r9 | | L2: | |
| Original non-speculative | | | Boosted speculative | |
| Sequence B: Static speculation using boosting | | | | |

Each speculative instruction is associated with a unique branch. For an instruction with label .N, this is the $N^{th}$ branch from the speculative instruction. For example, I2 and I1 are associated with the second branch. Actually, each branch has a preferred side, either the taken side or the not-taken side. Instructions can be speculated only from the preferred side. A speculative instruction with label .N is associated with the Nth branch on the path traced using the preferred side of the N−1 other branches on the path. In both of the branches shown, the preferred side is the not-taken side.

A trap caused by a speculative instruction is not reported immediately; instead, it is buffered until the branch associated with the instruction is executed. If the branch is not executed in the preferred direction, all of the buffered traps are thrown away. However, the branch is resolved in the preferred direction, and if a speculative instruction associated with the branch had trapped, then a trap is reported. For example, if I2 trapped, then the trap would not be reported until the second branch was executed. If the branch was not taken (i.e., it went in the preferred direction), a trap would be signalled.

Boosting postpones reporting a trap caused by a speculative instruction until the associated branch is executed. If that branch is executed in the preferred direction, a trap is automatically reported. A substantial amount of hardware is required to implement this scheme. This includes replicating the register file and possibly adding circuitry to ensure that a speculative instruction reads the correct values from a register.

U.S. Pat. No. 5,072,364, issued to Jardine et al. for "Method and Apparatus for Recovering from an Incorrect Branch Prediction in a Processor that Executes a Family of Instructions in Parallel", describes a method and apparatus for recovering from an incorrect branch prediction. Contiguous blocks of instructions, referred to as a family, are fetched. If no hardware resource or data conflicts exist, the instructions in a family are issued in parallel. Otherwise, they are issued serially. When any instruction in a family traps, all of the instructions in a family are flushed and reissued sequentially. If the family included a branch instruction and some instructions from the predicted side of the branch, and the branch was mispredicted, the family is flushed and reissued sequentially. The aforementioned patent deals with a minimal amount of dynamic speculation. Both instructions entail conditional execution of instructions and flushing their effects after a mispredicted branch.

U.S. Pat. No. 5,172,091, issued to Boufarah et al., for "System for Reducing Delay in Instruction Execution by Executing Branch Instructions in Separate Processor while Dispatching Subsequent Instructions to Primary Processor", describes a system for reducing delay in instruction execution. The system affects the instructions that are fetched and issued immediately after a branch is encountered. As long as the branch direction (i.e., taken/not-taken) is not known, the instructions immediately succeeding the branch (i.e., the not-taken side) are issued conditionally. As soon as the direction is known, instructions from that side begin to be issued. If the branch was taken, the conditionally issued instructions are flushed.

Both of these patents perform speculation by the hardware, at run-time. Moreover, neither of the patents deals with out-of-order issuance of instructions; the originally issued order of instructions is maintained.

The greatest distance of a speculated instruction in dynamic speculation furthest from a branch is less than the size of the pipeline plus the speculation window size. In static speculation, this is not possible. Statically-speculated instruction results must be buffered. This, of course, results in an increased complexity of implementation.

It would be advantageous for a compiler to schedule instructions so as to guarantee that the number of registers that must be buffered does not exceed the amount of buffer storage available.

It would also be advantageous for hardware not to report traps of speculative instructions until they are checkpointed.

It would also be advantageous not to issue stores to memory until checkpointed.

It would further be advantageous for the registers, traps and stores to be flushed or issued en masse.

It would also be advantageous to suppress execution of further instructions from a group when a speculative instruction causes a trap.

It would also be advantageous to facilitate restarting of the program after correcting or modifying the state or after performing any other actions necessary to recover from the trap.

SUMMARY OF THE INVENTION

In accordance with the present invention, there is provided a computer with a mechanism for implementing precise interrupts for statically speculated instructions. One or more assumptions are generated, and all instructions in each assumption are tagged identically. The identically tagged instructions are statically scheduled on a speculative basis. An instruction is then modified or inserted at one or more decision points prior to the point at which the instruction was speculated. The decision points may be positive ones (the instructions scheduled under that assumption have succeeded) or negative ones (the instructions scheduled under that assumption have failed), or both. The decision point may be positive for one assumption and may also be negative for another instruction. Static speculation may be performed down both sides of branches and may be performed simultaneously for multiple, independent paths.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

It is useful to operate on groups of speculated instructions at one time. Boosting, for instance, groups together all instructions which are associated with the same branch. This technique can detect whether any member of the group should have trapped. In both boosting and poison-bit schemes, the store buffer commits to memory as a group all speculatively issued stores associated with the same branch.

The present invention introduces a mechanism called tags, which is used to identify speculative instructions grouped together. Every speculative instruction in a group is labelled with an identical tag. Every frequently occurring action that must operate on a group of speculative instructions is implemented as an instruction that takes a tag or a set of tags as an argument. The action is applied to all instructions which are labelled with one of the argument tags.

A Reduced Instruction Set Computer (RISC) load/store architecture is an example of the sort of environment which lends itself to frequently occurring actions. The set of operations used in RISC systems can be speculative instructions intended for use with the present invention. The arithmetic and memory operations can be issued speculatively. A speculative instruction differs from its non-speculative version in that it is tagged (i.e., labelled with a tag). Speculation of memory operations is supported through a shadow write buffer, described in greater detail hereinbelow.

Figure 1A:
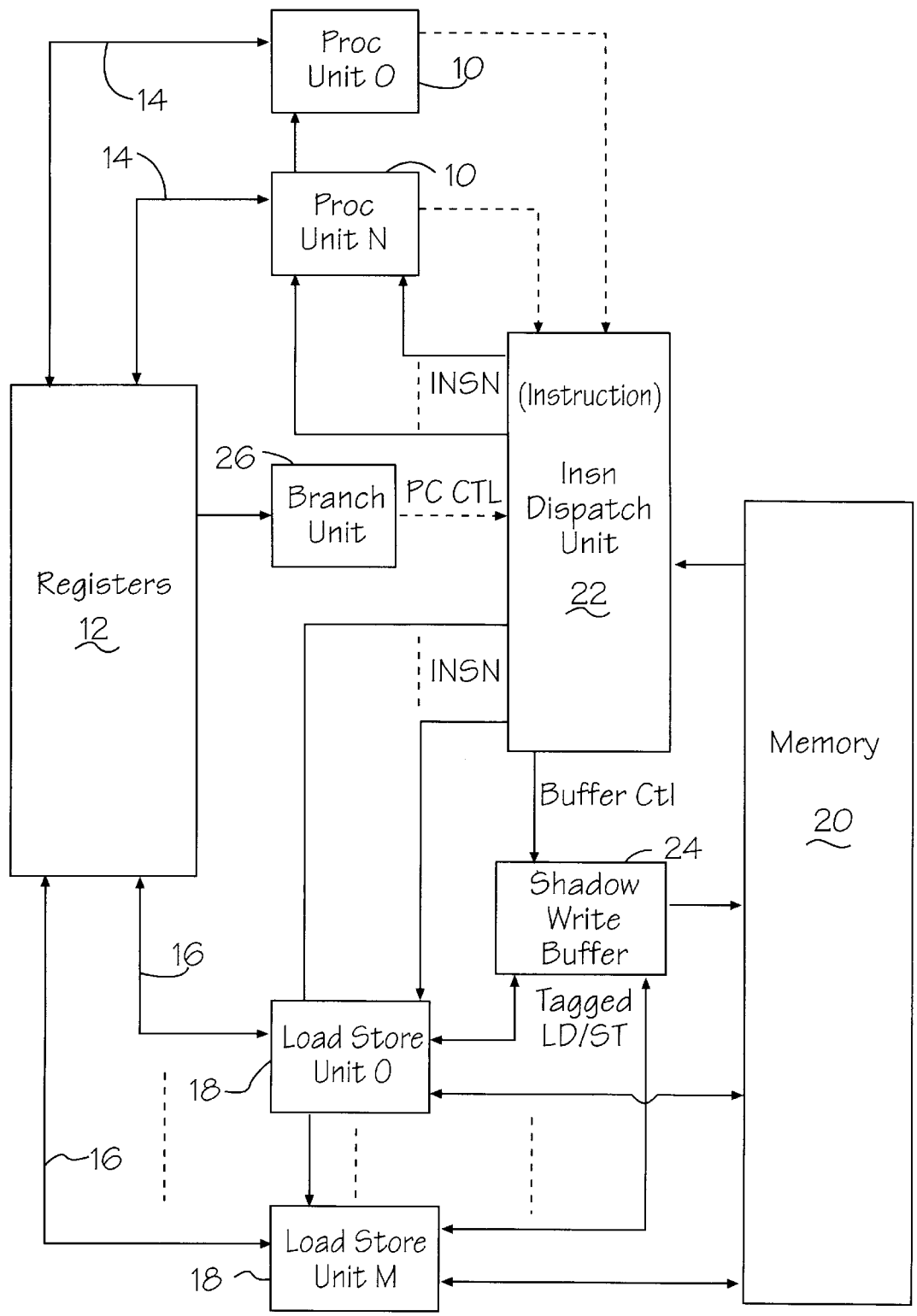
FIG. 1a is a block diagram of a VLIW processor.

Referring now to FIG. 1a, there is shown a block diagram depicting a VLIW processor. One or more processor units 10 (numbered PROC UNIT 0 through PROC UNIT n) are connected to registers 12 by means of a bidirectional bus 14. Also connected to registers 12 by means of a bidirectional bus 16 are one or more load/store controller units 18 (numbered LD/ST UNIT 0 through LD/ST UNIT m). Connected to load/store units 18 is a suitable memory device 20.

The heart of the speculative execution architecture in accordance with the invention is an instruction dispatch unit 22 and a shadow write buffer 24 connected thereto, about which more description is provided hereinbelow. Registers 12 are connected to instruction dispatch unit 22 by means of a branch unit 26. Both the processor unit(s) 10 and the load/store unit(s) 18 can communicate directly with instruction dispatch unit 22, as shown. Memory device 20 is also directly connected to instruction dispatch unit 22.

The shadow write buffer 24 is connected not only to instruction dispatch unit 22, but also to load/store unit(s) 18 and memory device 20, as shown. Shadow write buffer 24 is used to save the stores, so that the stores are accessible to speculative loads, but inaccessible to non-speculative loads until the store is checkpointed or flushed. In multiple branch environments, such as those disclosed herein, shadow write buffer 24 is additionally used to distinguish between on-path and off-path stores, as described hereinbelow.

Figure 1B:
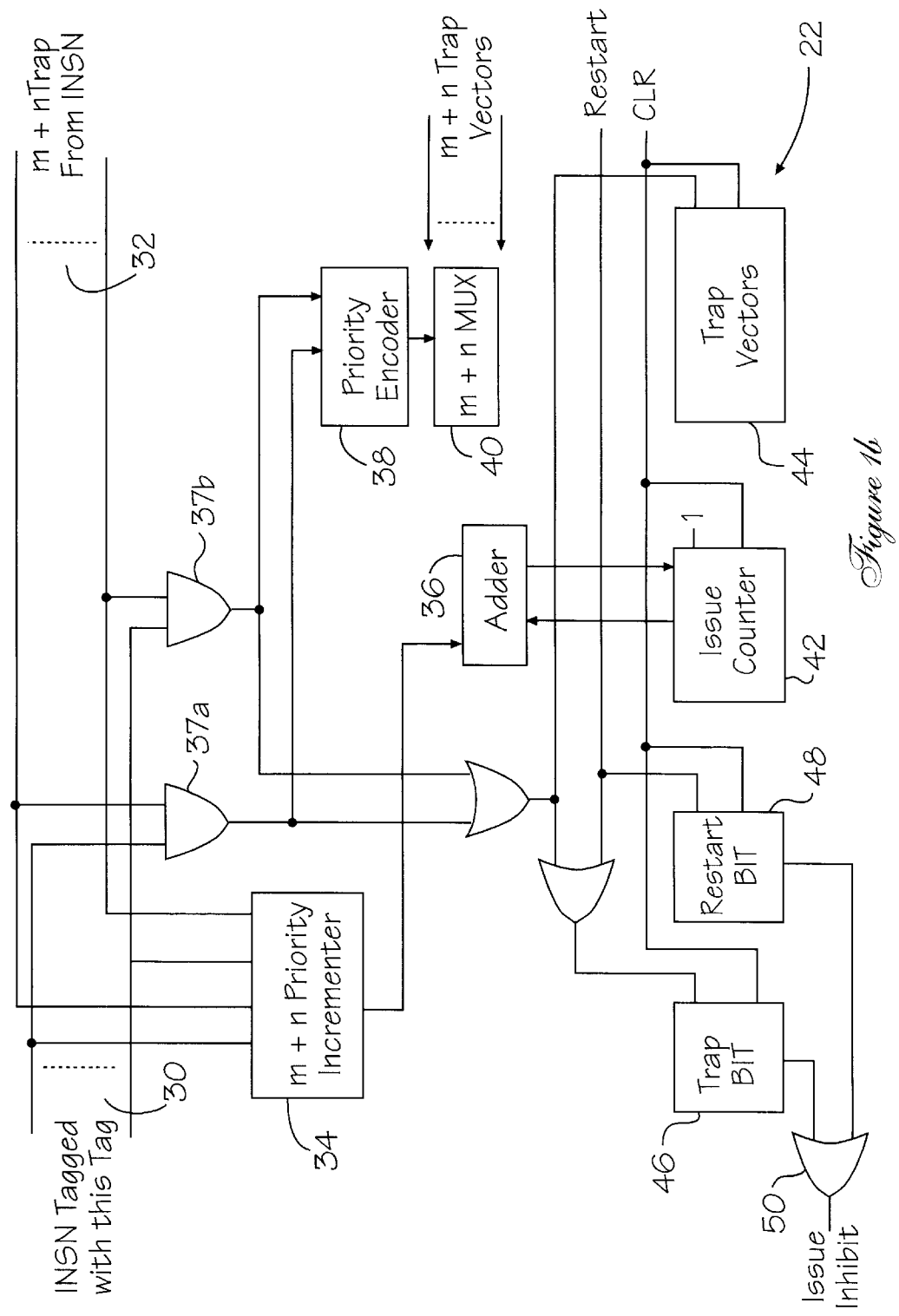
FIG. 1b is a block diagram depicting the instruction dispatch unit associated with each tag.

Referring now also to FIG. 1b, there is shown a block diagram depicting operations of the instruction dispatch unit 22 for each tag. This apparatus is provided to manage the tags. Instructions that are tagged with a specified tag identifier are applied to the instruction dispatch unit 22 (FIG. 1a) by a processor unit 10 over bus 30. A number "m" of load/store units 18 and a number "n" of processor units 10 provide m+n traps from instruction dispatch unit 22 over trap bus 32. Both buses 30 and 32 are applied to an m+n priority incrementer 34, to which is connected an adder 36. The m+n priority incrementer 34, in conjunction with the adder 36, adds up all instructions in a tag if no trap occurred. If a trap had occurred for that tag, however, all tagged instructions up to the trap are added.

Connected to both buses 30 and 32, by means of AND gates 37a and 37b, is a priority encoder 38. Priority encoder 38 places the instructions that trapped into a predetermined order for each cycle. Priority encoder 38 is connected to an m+n multiplexer 40. The m+n trap vectors are applied to m+n multiplexer 40, as shown, to determine whether the instruction trapped. If the instruction has trapped, AND gates 37a and 37b determine if an instruction with a tag was trapped.

An issue counter 42 is connected to adder 36 and a trap vector register 44 is connected to m+n multiplexer 40. Adder 36 increments issue counter 42 by the number of instructions with that tag, and prior to the trapping instruction, if any. Should any instruction with that tag have trapped, the m+n multiplexer 40 selects the trap information corresponding to the earliest such instruction and loads them into trap vector register 44. An appropriate trap bit 46 and restart bit 48 are provided for status and control.

When a restart command is issued, both trap bit 46 and restart bit 48 are set. A clear (CLR) command sets both bits 46 and 48, as well as issue counter 42 and trap vector register 44 to zero. OR gate 50, connected to both trap bit 46 and restart bit 48, generates an ISSUE INHIBIT signal if either bit 46 or 48 is set. The ISSUE INHIBIT signal instructs the machine, when it encounters an instruction with that tag, to issue a no-op command.

Two new behaviors which manipulate tags are required: check and flush. They may be implemented as modifications to existing instructions or separate commands; however, for purposes of clarity of description, it is best to consider that these behaviors as instructions.

Figure 2:
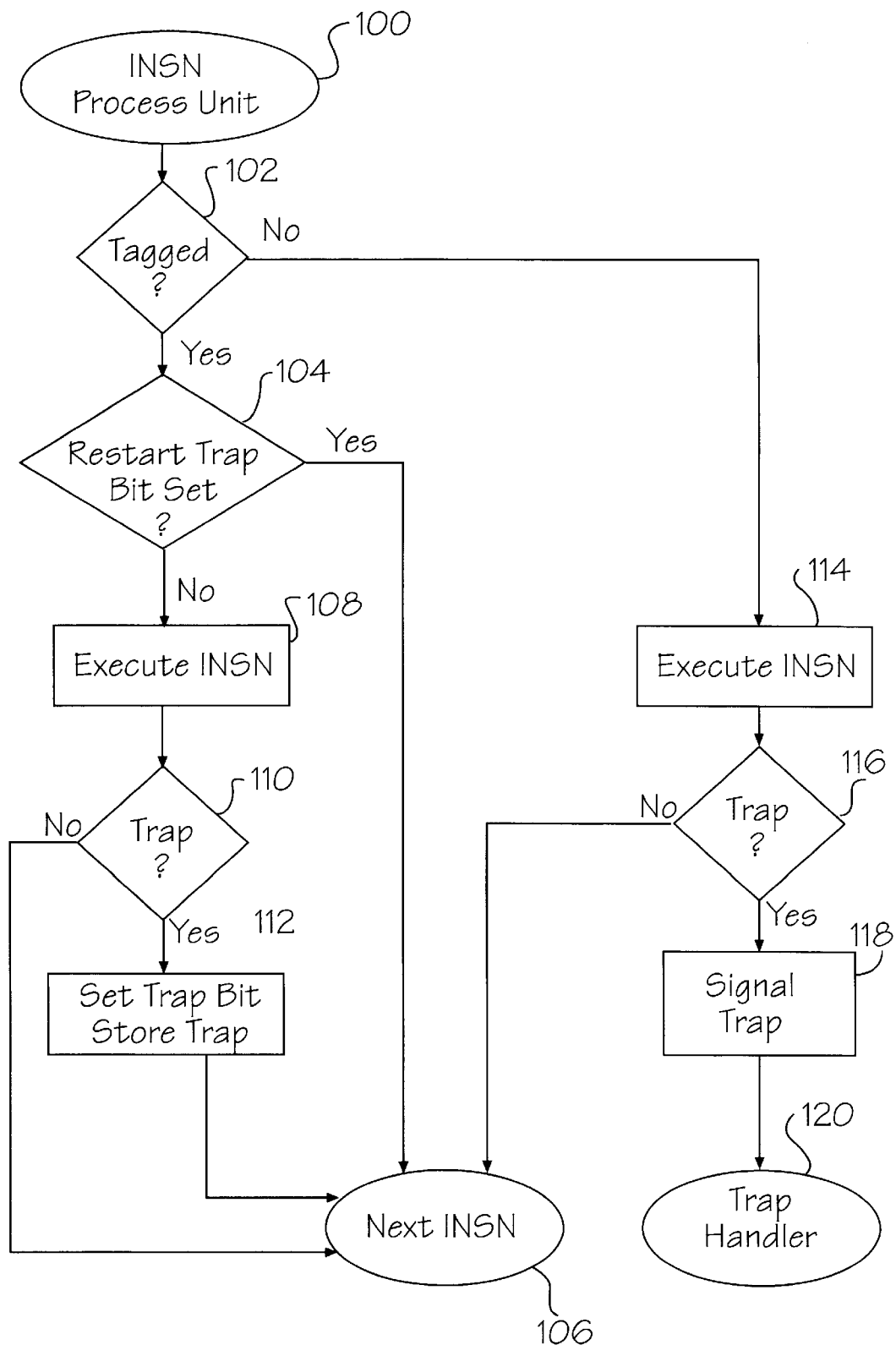
FIG. 2 is a flow chart depicting execution of a process unit instruction.

The process for issuing a typical processor unit instruction or command is depicted in FIG. 2. Each of the instructions issued by processor unit(s) 10 (FIG. 1a), which include fixed point, floating point, and other ALU operations, can be tagged and subsequently modified. The processor unit instruction is first provided, step 100, and the system determines whether the instruction has been tagged, step 102. If so, the system determines whether trap bit 46 (FIG. 1a) or restart bit 48 for that tag has been set, step 104. If either bit has been set, the system proceeds to the next instruction, step 106. If, however, neither the trap bit 46 nor the restart bit 48 for that tag has been set, step 104, the instruction is executed, step 108.

The system then determines whether a trap has occurred, step 110. If not, the system proceeds to the next instruction, step 106. If a trap has occurred, however, step 110, the trap bit 46 for that tag is set and the trap vector is stored, step 112, before the system proceeds to the next instruction 106.

In the situation in which the original processor unit instruction has not been tagged, step 102, the system executes the instruction, step 114. Once the instruction has been executed, step 114, the system determines whether a trap had occurred, step 116. If not, the system proceeds to the next instruction, step 106. If a trap had occurred, however, step 116, the trap is signalled, step 118, and the trap handling routine is immediately initiated, step 120.

Figure 3:
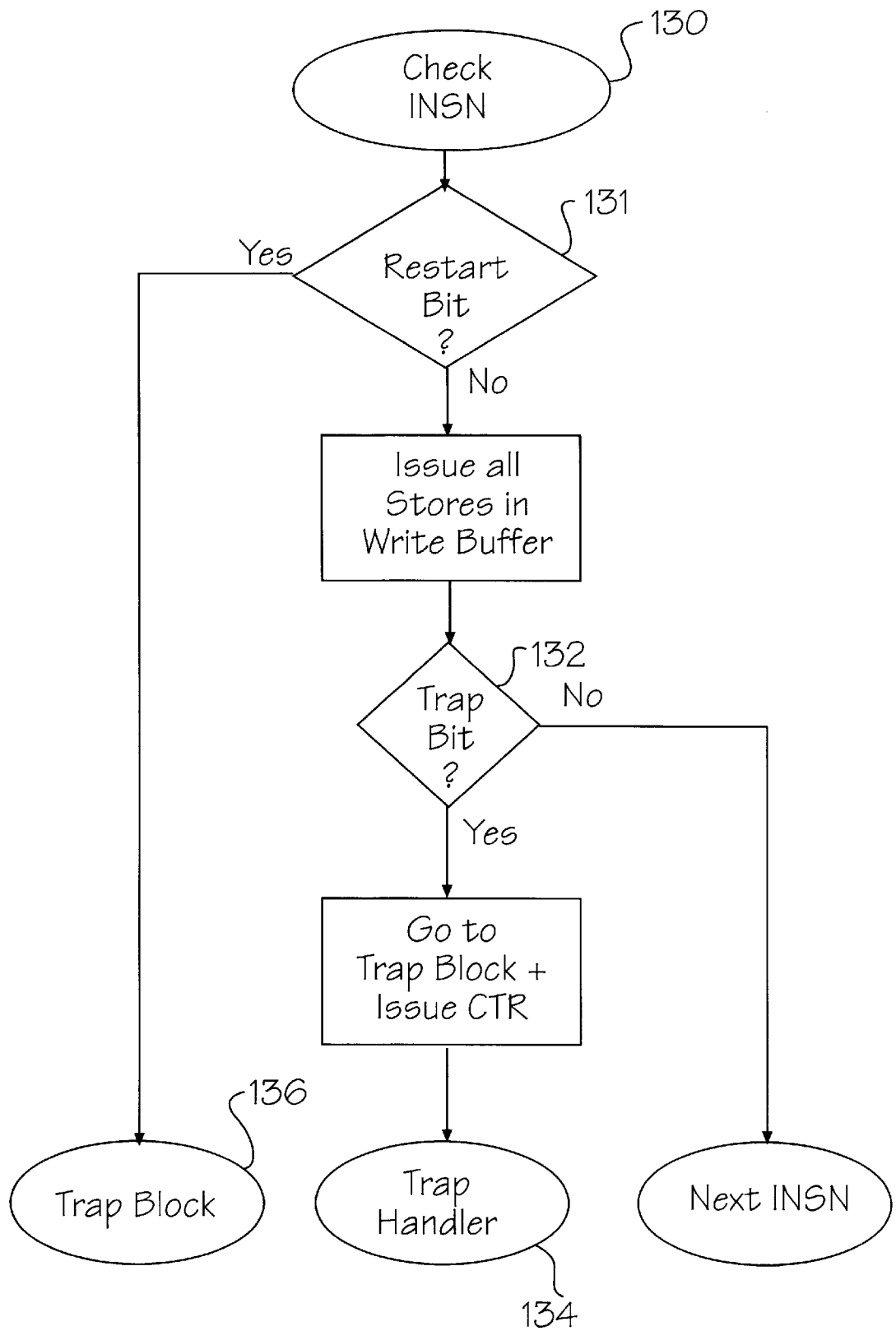
FIG. 3 is a flow chart depicting execution of a check instruction.

Referring now also to FIG. 3, there is shown a flow chart of operations for the check (short for checkpoint) command (instruction). The check command, step 130, takes one tag as an argument. If the restart bit has not been set, step 131, all stores associated with the tag are issued. If any speculative instruction having that tag trapped, step 132, the trap is reported, step 134. Assuming no instruction in that tagged group trapped, all stores in the shadow buffer that were performed by instructions with the tag are committed to memory. In some architectures, registers 12 (FIG. 1b) may also be flushed. The tag is freed for reuse.

Figure 4:
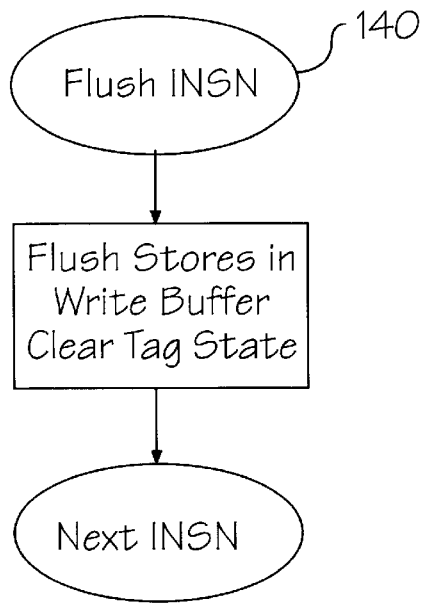
FIG. 4 is a flow chart depicting execution of a flush instruction.

Referring now also to FIG. 4, there is shown a flow chart of operations for the flush command (instruction). The flush command, step 140, takes a set of tags (represented by a bit-vector) as an argument. All stores in the shadow write buffer 24 that were performed by instructions with a tag in the set are discarded. Both the tag and buffer space are freed for reuse.

A speculative instruction is checkpointed by a checkpoint instruction if it has the same tag as the checkpoint instruction and if there were no intervening flush or checkpoint instructions with that tag.

The example in Sequence C shows how tags can be used to implement speculation. In this and all other examples, unless otherwise stated, all instructions that were speculated from the same basic block shall use the same tag.

```
        L0:                              L0:
                branch L7        I2*:           3:r3 = . . .
        L1:                      14*:           1:r5 = . . .
I0:             r1 = . . .       I0*:           3:r1 = . . .
I1:             r2 = . . .                      branch L7
I2:             r3 = . . .               L1:
                branch L8        I1:            check 3
        L2:                                     r2 = . . .
I3:             r4 = . . .       I3*:           1:r4 = . . .
I4:             r5 = . . .  ==>                 branch L8
I5:             r6 = . . .               L2:
                                                check 1
                . . .            I5:            r6 = . . .
                                                . . .
        L7:                              L7:
                                                flush 1,3
                . . .                           . . .
        L8:                              L8:
                                                flush 1
        Original                        Speculative
    Sequence C: Compiling for the flexible inferred model
```

Instructions moved from blocks L1 and L2 have tags 3 and 1, respectively. A checkpoint instruction for the corresponding tag is inserted at the beginning of the basic block. Every time an instruction with tag T is moved past a branch from some direction, a flush instruction for that tag is placed in the target of the untaken destination.

A trap caused by a speculative instruction is buffered until it is checkpointed. Several mechanisms cooperate to make it possible to report such a trap in a single cycle, and restart with very little overhead.

These mechanisms, described hereinbelow, result in a program whose trapping behavior is equivalent to a non-speculative program which can be derived using the following steps. The checkpoint and flush instructions are deleted. Each speculative instruction is replaced by its corresponding non-speculative instruction and placed at its checkpoint. If more than one speculative instruction was checkpointed by a checkpoint instruction, the non-speculative instructions are arranged in the order of issue of their speculative equivalents. Continuing the example above, this results in the code in Sequence D.

```
          L0:                         L0:
I2*:       3:r3 = . . .                branch L7
I4*:       1:r5 = . . .               L1:
I0*:       3:r1 = . . .       I2:      r3 = . . .
           branch L7          I0:      r1 = . . .
          L1:                  I1:      r2 = . . .
           check 3                      branch L8
I1:        r2    = . . .      L2:
I3*:       1:r4  = . . .      I4:      r5 = . . .
           branch L8   ==>    I3:      r4 = . . .
          L2:                 I5:      r6 = . . .
           check 1
I5:        r6    = . . .                . . .
          L7:                         L7:
           flush 1,3
           . . .                        . . .
          L8:
           flush 1                    L8:
           Speculative                Inferred
     Sequence D: Inferring a sequential program
```

Each tag has state associated with it. For trap handling purposes, this includes a trap vector. When a speculative instruction with tag T should have trapped, the trap information (e.g., type of trap) is buffered in the trap vector for tag T.

The trap vector and all other state information associated with a tag are cleared when the tag is flushed, or after it has been checkpointed.

Before issuing a speculative instruction with tag T, the issue hardware determines, by means of the ISSUE INHIBIT signal (FIG. 1b) for tag T, whether a previous speculative instruction with tag T should have trapped. If so, the issue hardware squashes the instruction, treating it as if it were a no-op. This is known as the no-op rule.

At the checkpoint for tag T, the trap bit for T is examined. If it is clear, execution proceeds as usual. If it is not, all stores associated with the tag T are committed. After that, the trap (which was buffered in the trap vector register 44 (FIG. 1b)) is reported.

The no-op rule ensures that only those speculative stores are issued that appear before the speculative instruction that should have trapped. Thus, committing the speculative stores is correct, since the stores that are in the store buffer would have occurred before the trapping instruction, if those instructions had been executed sequentially.

Each checkpoint has an associated trap block (Sequence E, described below), much like the one associated with each branch in the boosting scheme. The trap block associated with a checkpoint contains the non-speculative version of all instructions to be checkpointed by that checkpoint instruction. The order in which they appear is the same as the issue order of the speculative instructions. It is terminated by a jump to the instruction after the checkpoint.

Each tag has state to support restart. This state will be cleared at each flush and after each checkpoint. The state for a tag comprises:

a) Issue Counter 42 (FIG. 1b)—The issue counter for tag T counts the number of speculative instructions with tag T that were issued before the first one trapped.

b) Restart Bit 48—This is a bit which modifies the actions of the checkpoint command.

Figure 5:
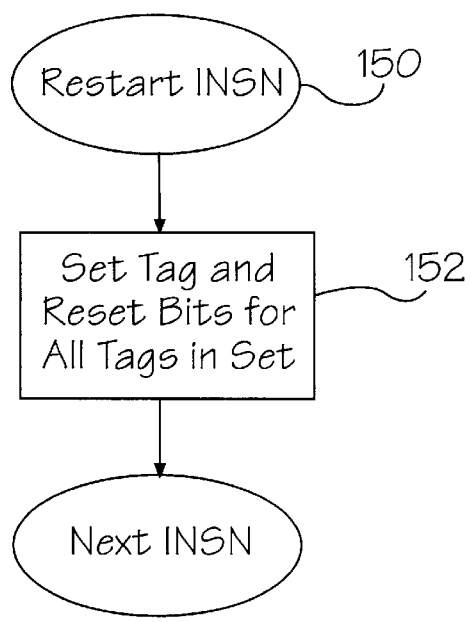
FIG. 5 is a flow chart depicting execution of a restart instruction.

Referring now also to FIG. 5, an additional command or instruction (restart) is required to support trap recovery and the behavior of the checkpoint instruction must be modified.

c) Restart—The restart instruction, step 150, takes a set of tags as an argument. It sets the restart bit 48 (FIG. 1b) for all tags in the argument, step 152.

d) Check—The checkpoint instruction (FIG. 3) for tag T checks the restart bit 48 for T. If it is not set, step 131, it proceeds as described above. Otherwise, it clears the tag T and discards all stores associated with that tag. It immediately executes the entire trap block, step 136.

On a trap, the trap handler uses the address of the checkpoint instruction to find the beginning of the associated trap block. It adds the issue counter value to this address to find the instruction which would have trapped. After fixup, the trap handler issues a restart instruction and resumes execution at the trapping instruction.

The trap blocks produced for the sample program are shown in Sequence E. An apparent problem is the fact that there is no provision in the trap block for restoring the "speculative" state. In this example, for instance, if I0* were to trap, the trap handling code would re-execute I0 but not I4*. Actually, I4 is re-executed, but in a "lazy" fashion.

```
           L0:                    ASSOC:
I2*:        3:r3 =
I4*:        1:r5 = . . .                   . . .
                                           C0
                                           TRAP_C0
I0*:        3:r1 = . . .                   C1
                                           TRAP_C1
            branch L7                      . . .
           L1:              TRAPC0:
C0:         check 3   I2':   r3 =
I1:         r2    = . . .  I0':   r1 =
I3*:        1:r4 = . . .           jmp C0+1
            branch L8 TRAP_C1:
           L2:              I4':   r5 =
C1:         check 1   I5':   r4 =
I5:         r6    = . . .           jmp C1+1
           Speculative              Trap
              Sequence E: Trap block
```

The trap handler issues the restart instruction before resuming execution. In the example, this sets the restart bit for tag 1. If the second branch is taken, instruction 1 is flushed and the restart bit is cleared. However, if the branch is not taken, the checkpoint instruction is executed. The restart bit results in the checkpoint instruction discarding all stores associated with 1, and then invoking a trap handler which starts executing at TRAP_C1. Thus, I4' and I5' are executed.

A fairly substantial amount of state information must be saved on a context switch. This includes the state information needed exclusively for supporting static speculation, including the state associated with the tags and the shadow buffer. However, it is not necessary to save this "speculative" state on a context switch. All that must be swapped in and out is the state saved in a non-speculative architecture, such as registers, pc, etc. The restart bit should be set for all the tags before resuming execution. This forces all of the speculative state to be regenerated, using the same lazy mechanism as described above.

As mentioned above, a register read by a speculative instruction cannot be reused until the point where that speculative instruction would have executed in a sequential manner. The reason for the non-reuse rule was that the value of the first write would be needed for debugging and/or restarting, if the sequential code would have trapped between the two writes. However, it is possible to reuse registers in one case. A dead register that is written to by a speculative instruction with tag T, and read exclusively by speculative instructions with tag T, can be reused by a speculative instruction with tag T before all uses are checkpointed. Since the no-op rule would inhibit the second write, the value of the first write would be available.

Registers that hold the results of speculative operations can be spilled (saved in memory 20 (FIG. 1*a*)), thus freeing the spilled registers 12 for reuse. However, the register values must be restored before the checkpoint.

The major difference between the fixed and flexible inferred models is that, in the fixed model, speculative registers have to be copied to sequential registers. This is logically done as part of the checkpoint operation. However, a straight-forward implementation of this as a sequence of moves followed by a copy would be incorrect. This is illustrated by the example in Sequence F. If I0 were to trap, it would be incorrect for r2 to contain the value produced by I1, as would happen here.

The solution involves introducing a new instruction: map. A map takes as input a tag T, a source register and a destination register. If the source is written to by a speculative instruction with tag T, then the source is copied to the destination.

```
        L0:                        L0:
              branch . . .    I0*:      1:r33 =
        L1:                    I1*:      1:r34 =
I0:         r1  = . . .                  branch . . .
I1:         r2  = . . .              L1:
I2:         r3  = . . .  ==>             r1  = r33
                                         r2  = r34
                                         check 1
                                         r3  = . . .
                                     I2:
        Original                     Speculative
Sequence F: Copies in the fixed inferred model
```

This obviously requires extra state in each tag, which keeps track of the registers written to by all instructions with that tag. Sequence G continues the example.

```
        L0:                        L0:
              branch . . .    I0*:      1:r33 =
        L1:                    I1*:      1:r34 =
I0:         r1  = . . .
              branch . . .  ==>
I1:         r2  = . . .              L1:
I2:         r3  = . . .                  map 1, r1, r33
                                         map J, r2, r34
                                         check 1
                                     I2:     r3 =
        Original                     Speculative
Sequence G: Copying in the fixed inferred model, using maps
```

This requires issuing one instruction per copy just before the checkpoint. A more efficient scheme would allow maps to be issued at any time, thereby using gaps in the instruction stream to store the mapping. The checkpoint instruction uses the mapping information to optimize the copying. This optimization could involve explicit copying. However, it is possible to implement a fast, logical copy at the cost of extra hardware. The flush instruction would discard the mapping associated with the tag being flushed. The resulting code would look like that in Sequence H.

```
        L0:                        L0:
              branch . . .                map 1, r1, r33
        L1:                    I0*:      1:r33 = . . .
I0:         r1  = . . .         I1*:      1:r34 = . . .
I1:         r2  = . . .  ==>              map 1, r2, r34
I2:         r3  = . . .                   branch . . .
                                     L1:
                                         check 1
                                     I2:     r3 = . . .
        Original                     Speculative
Sequence H: Compiling for fixed inferred model, using maps
```

The restart bit, as per usual, nullifies all state update operations. Specifically, if the restart bit is set, no mapping occurs.

The reference model forces traps to be reported as though instructions were executed in the order of the reference program. Many of the mechanisms described take advantage of the order in which the speculative instructions are issued. Either the speculative instructions occur in the same order as their non-speculative versions occur in the reference program, or other mechanisms must be used while programming for the reference model. All mechanisms that rely on the no-op rule are invalidated. Also, the trap vector register and issue counter may not be used to quickly report traps and identify the instruction that trapped.

Instead, a mechanism much like that of boosting is used. The instructions in the trap block are ordered in the same order as they appear in the reference program. At a checkpoint, if any speculative instruction had trapped, no update (i.e., mapping and writing of stores) takes place. Instead, all of the speculative state is flushed and the program starts executing the trap block. Exactly as in the boosting scheme, some instruction will trap; that trap will be reported.

Figure 6:
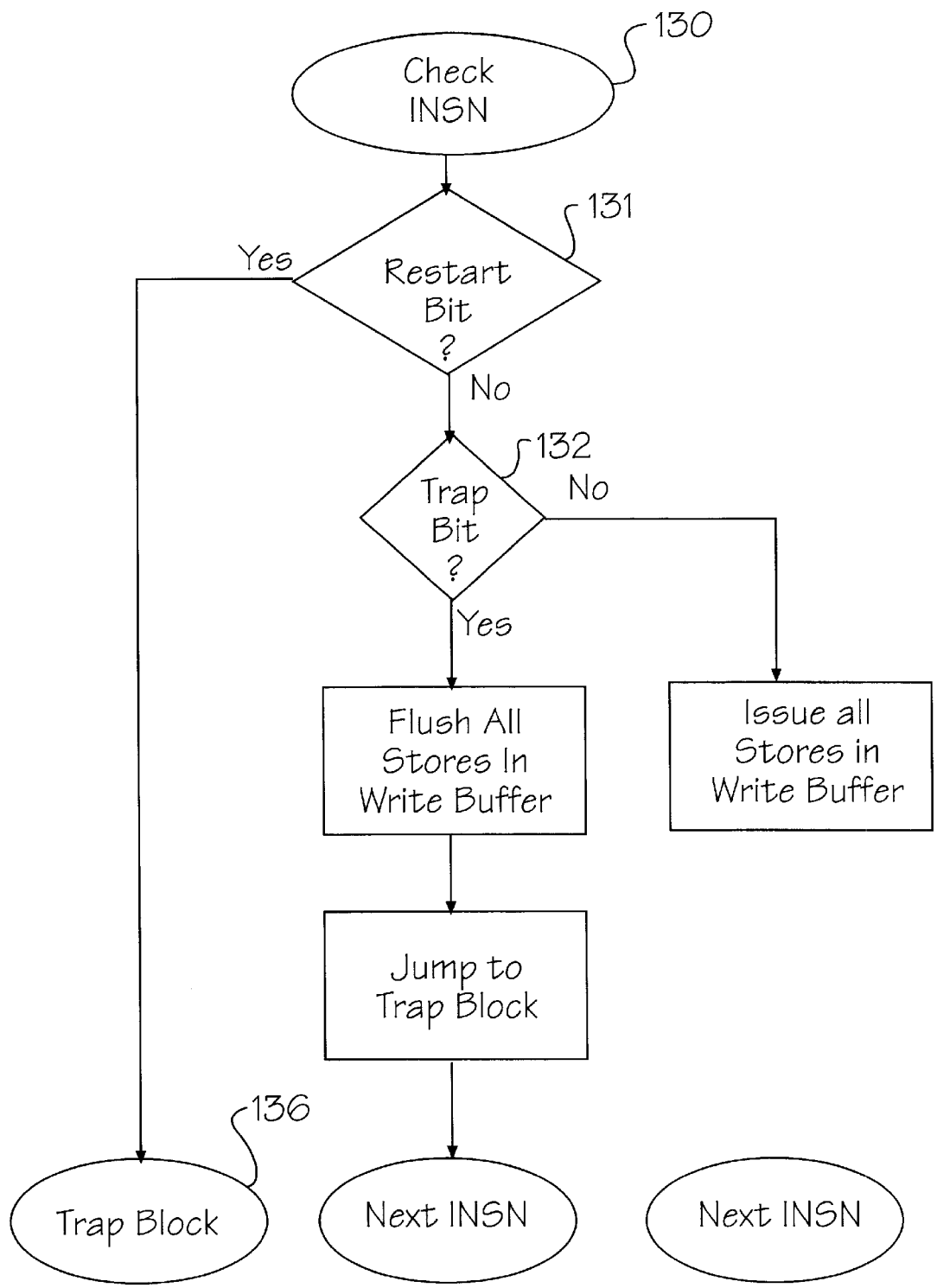
FIG. 6 is a flow chart depicting execution of a check instruction.

Referring now also to FIG. 6, the modified checkpoint instruction with the semantics necessary for supporting the reference model is: checkf. The checkf instruction, step 160, behaves exactly as a check instruction (cf. FIG. 3) if either the restart bit 48 (FIG. 1*b*) is set, step 162, or no instruction has trapped, step 164. However, if some instruction had trapped, it flushes the mapping and store instructions, step 166, and starts executing the associated trap block sequentially, step 168.

While scheduling for the reference model, if some instruction is scheduled speculatively, then all instructions between it and the first instruction in the block to be scheduled speculatively, must also be scheduled speculatively. The checkpoint is placed in the position of the first instruction that was scheduled speculatively.

In Sequence I, instruction I2 has to be scheduled speculatively, since it is between I1 and I3, which are scheduled speculatively. However, that does not require it to be scheduled before a branch, so long as it is before the checkpoint.

```
    L0:                     L0:                      L0:
map 1, r2, r33                   branch . . .       map 1, r2, r33
I3*: 1:r34 = . . .          L1:                     I3*: 1:r34 = . . .
I1*: 1:r33 = . . .     I0:     r1 = . . .           I1*: 1:r33 = . . .
map 1, r4, r34         I1:     r2 = . . .           map 1, r4, r34
    branch . . . <==>  I2:     r3 = . . .    ==>       branch . . .
    L1:                I3:     r4 = . . .              L1:
map 1, r3, r3S         I4:     r5 = . . .              check 1
I2*: 1:r35 = . . .                                  I0: r1 = . . .
I0: r1 = . . .                                      I2: r3 = . . .
checkf 1                                            I4: r5 = . . .
I4: r5 =
    Reference              Original                    Inferred
                                                        Fixed
       Sequence I: Compiling for the reference model
```

So far, all of the examples have assumed that all speculative instructions that originally belonged to the same basic block used the same tag. It may not always be beneficial to do so. Consider the code in Sequence J. The traps for the two instructions are checked for separately, in the order in which they occurred in the reference program. This is similar to the actions taken by the poison-bit scheme. The similarity arises from the fact that a tag with only one register associated with it is akin to a register with a poison-bit (and other information), and its checkpoint to a sentinel.

```
    L0:                              L0:
        branch . . .                     map 2, r2, r33
    L1:                          I3*:    1:r34 = . . .
I0:     r1   = . . .             I1*:    2:r33 = . . .
I1:     r2   = . . .                     map 1, r4, r34
I2:     r3   = . . .   <==>              branch . . .
I3:     r4   = . . .                 L1:
I4:     r5   = . . .             I0:     r1 = . . .
                                         check 2
                                 I2:     r3 = . . .
                                         check 1
                                 I4:     r5 = . . .
        Original                         Reference
    Sequence J: Using multiple tags for the same basic block
```

Compiling for the inferred and reference models on an architecture which distinguishes between sequential and speculative state is similar to compiling for the fixed inferred and reference models discussed above. The only difference has nothing to do with tags, but deals with the mapping of register names to physical register locations.

A register name in a non-speculative instruction refers to the contents of the sequential registers. A destination register name in a speculative instruction refers to a register in the speculative state. However, a source register name can have many interpretations. The simplest to implement will return the value in the speculative register. In the case that no unflushed/uncheckpointed instruction has written to the speculative register, the value returned will be in the sequential register of the same name.

One possible optimization occurs if the system does not save speculative state on a context switch. In that case, the speculative registers need not be saved.

With respect to general directed acyclic graphs (DAGs) the programmer or compiler has precise control over checkpointing, flushing and register mapping. The following sections will illustrate some of the techniques applicable to speculating in a DAG.

Figure 7:
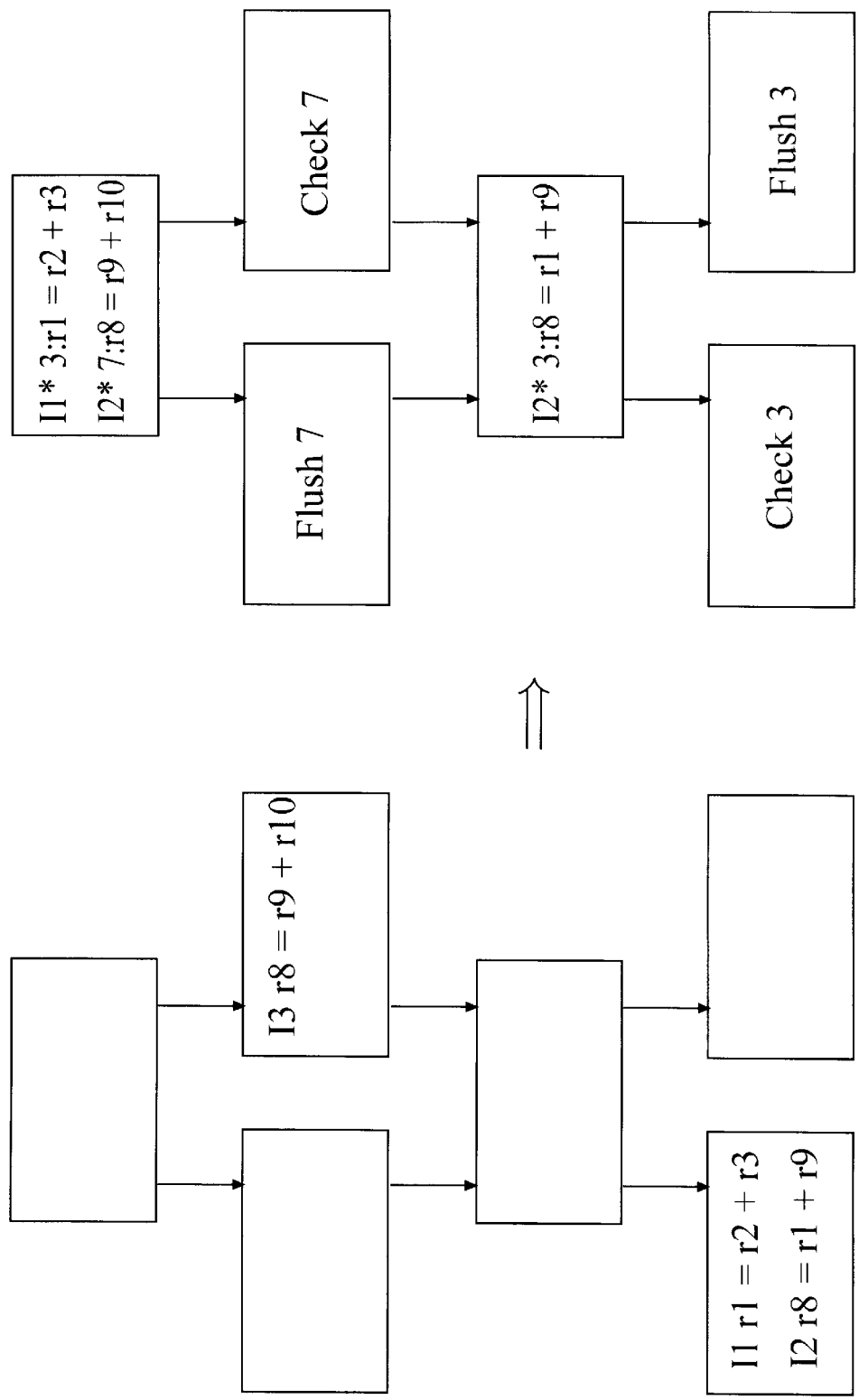
FIG. 7 depicts a sequence of two independent speculative instructions.

An instruction is control-dependent on another if it executes only if the other one does. Two instructions are independent if neither is control-dependent on the other. In the case of speculative instructions, this means that the fact that an instruction is checkpointed or flushed does not imply that the other is checkpointed or flushed. Such a situation is illustrated in FIG. 7.

Figure 8:
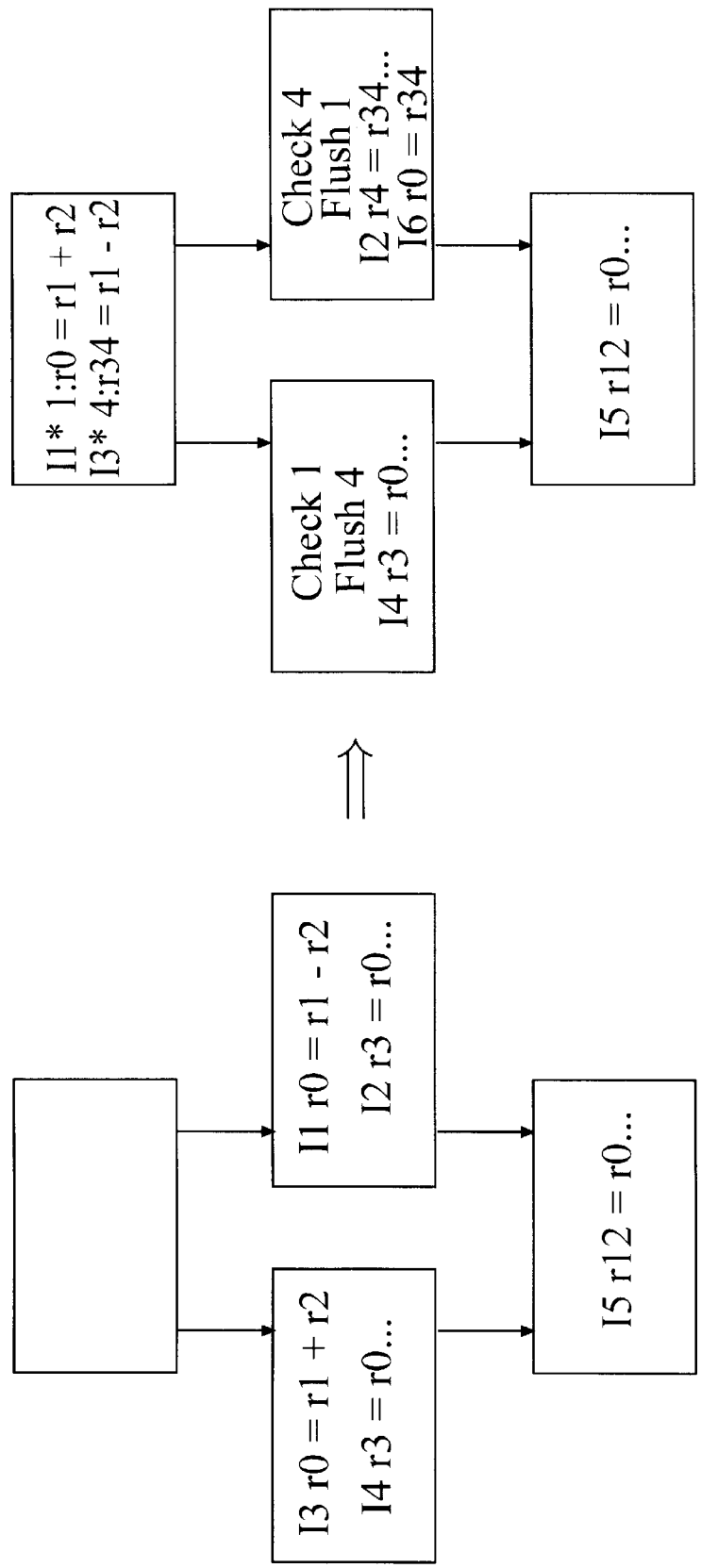
FIG. 8 depicts a sequence of speculative instructions past both sides of an IF-THEN-ELSE branch.

The example in FIG. 8 illustrates some of the issues involved in speculation past both sides of a branch. The flush instructions discard the effects of instructions speculated from the other (non-taken) side of the branch. The checkpoint instructions commit the effects of instructions which were speculated from the basic block in which the checkpoint exists.

One of the two occurrences of r0 had to be renamed. In the sequential model, the r0 could be used as the destination for both computations, since control flow would ensure that the result of only one of the computations would be live at any one time. After speculation, however, the two values are live simultaneously and require two registers to hold the values. Renaming all uses (I2) should be sufficient to ensure that the correct value is read. However, if there exists a use (I5) that can read both of the values, it becomes necessary to reconcile the names by adding a copy instruction (I6).

Figure 9:
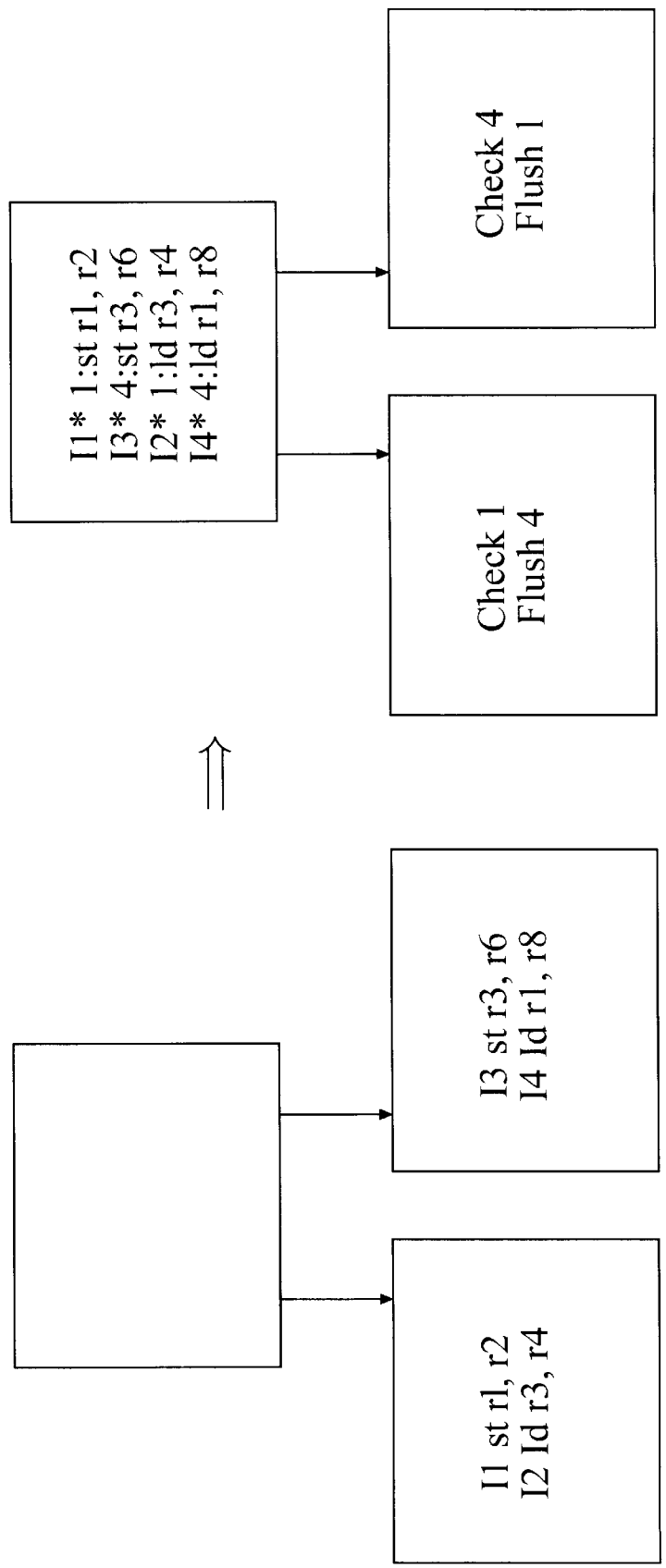
FIG. 9 depicts a sequence representing speculation of memory operations.

The major modification required in order to support DAG speculation is that of the memory operations and the shadow write buffer 24 (FIG. 1a). An example showing where the previously mentioned shadow write buffer 24 will not work is illustrated in FIG. 9. Here, I2 should read the value at address r3, which is the value being stored by I1 if r3==r1; otherwise, it should read the value in memory. But it incorrectly reads the value stored by I3. Moreover, as long as it is not known for sure that r1 is always different from r3, or always the same, no order of the four speculative instructions is correct.

Figure 10:
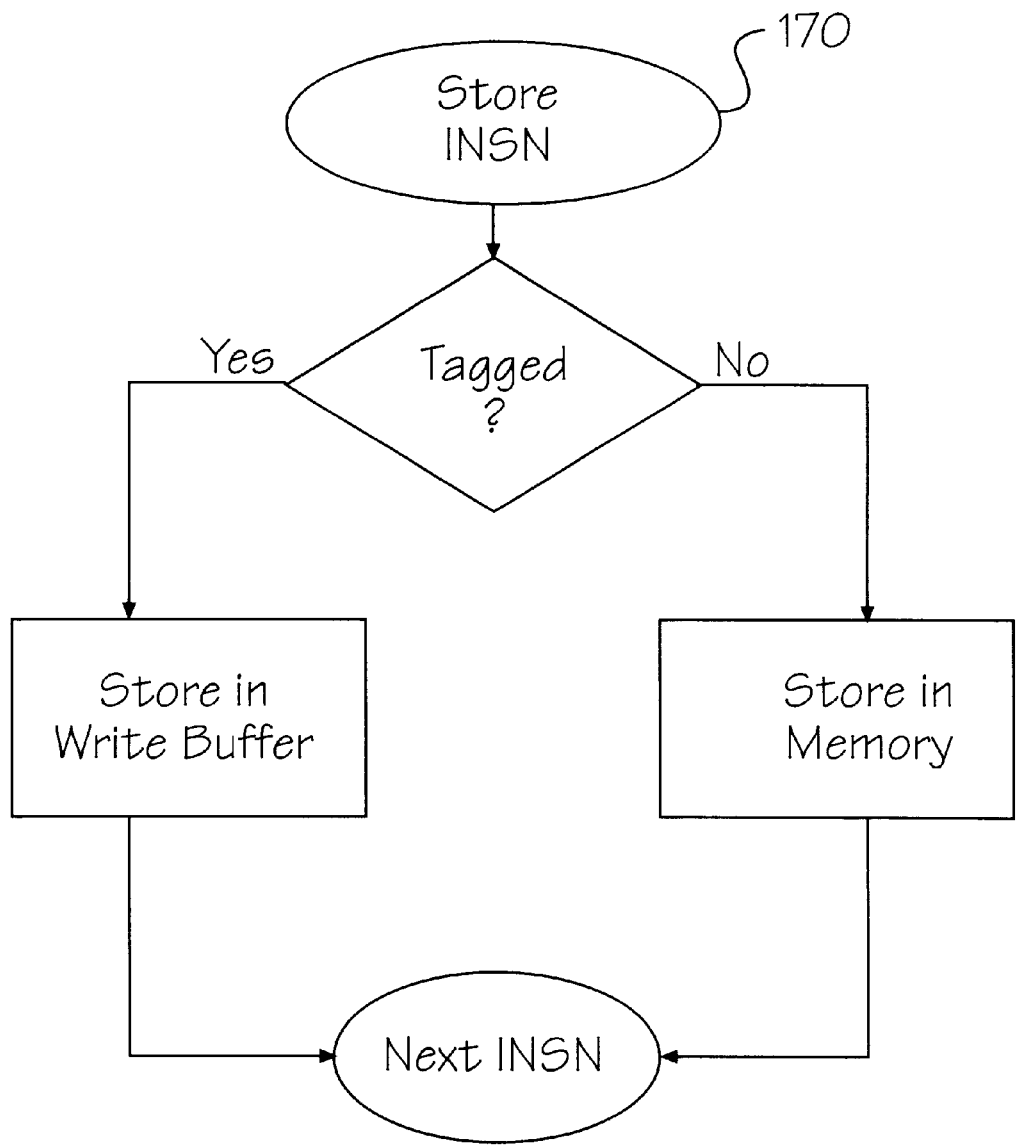
FIG. 10 is a flow chart depicting execution of a store instruction.
Figure 11:
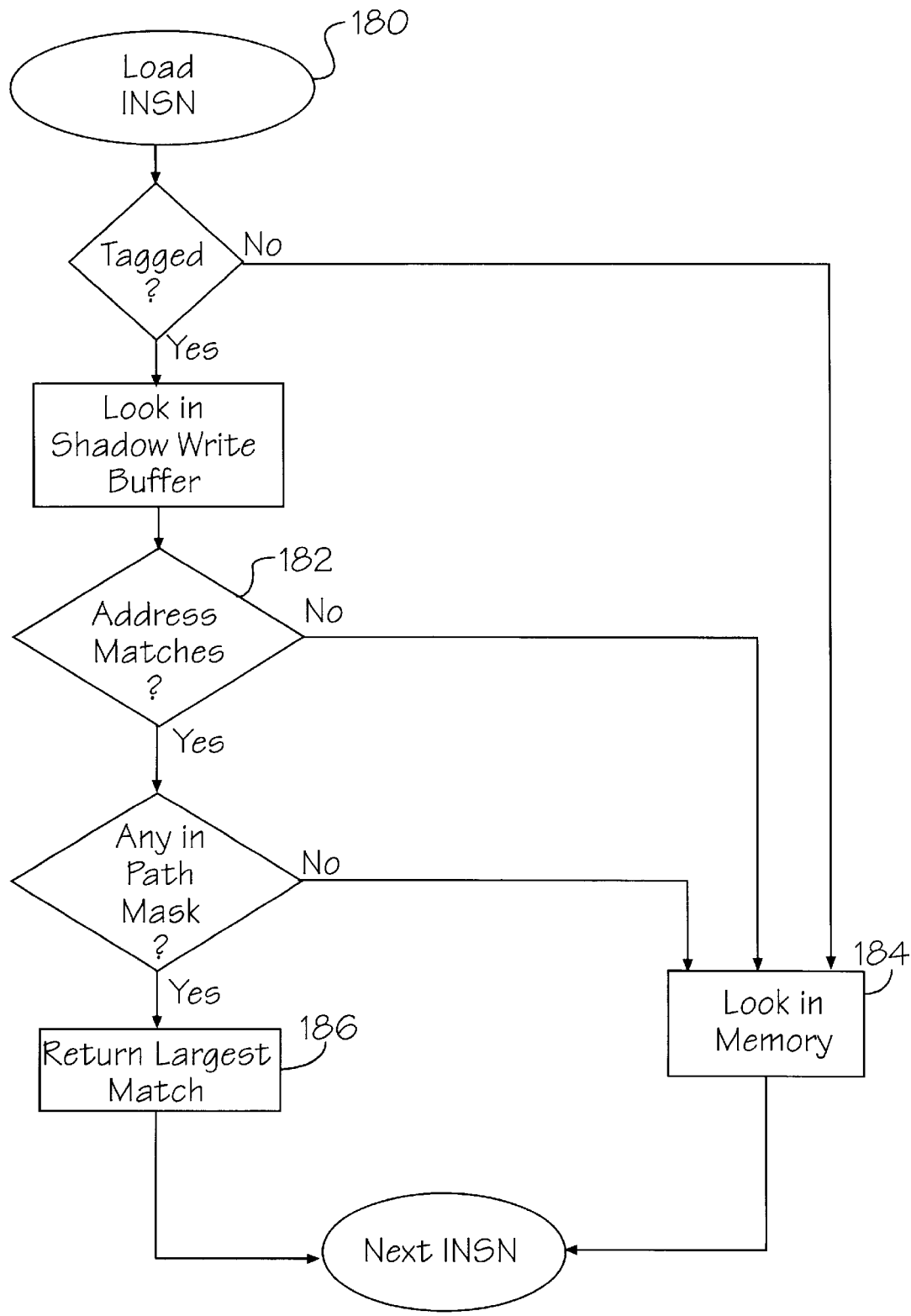
FIG. 11 is a flow chart depicting execution of a load instruction.

Referring now to FIGS. 10 and 11, there are shown flow charts depicting execution of store and load instructions, respectively.

In a sequential execution, each load, step 180 (FIG. 11) would be affected only by the stores on paths from the beginning of the DAG to the load. Speculation moves stores onto the path that were originally not on such paths. The problem is to make the speculative loads ignore these extraneous stores and consider only those speculative stores which were originally on-path. The ideal approach would be for each speculative load to list all of the speculative stores that should be considered. This is not practical, as it requires too many bits. Instead, the tags of all these stores are listed.

Figure 12:
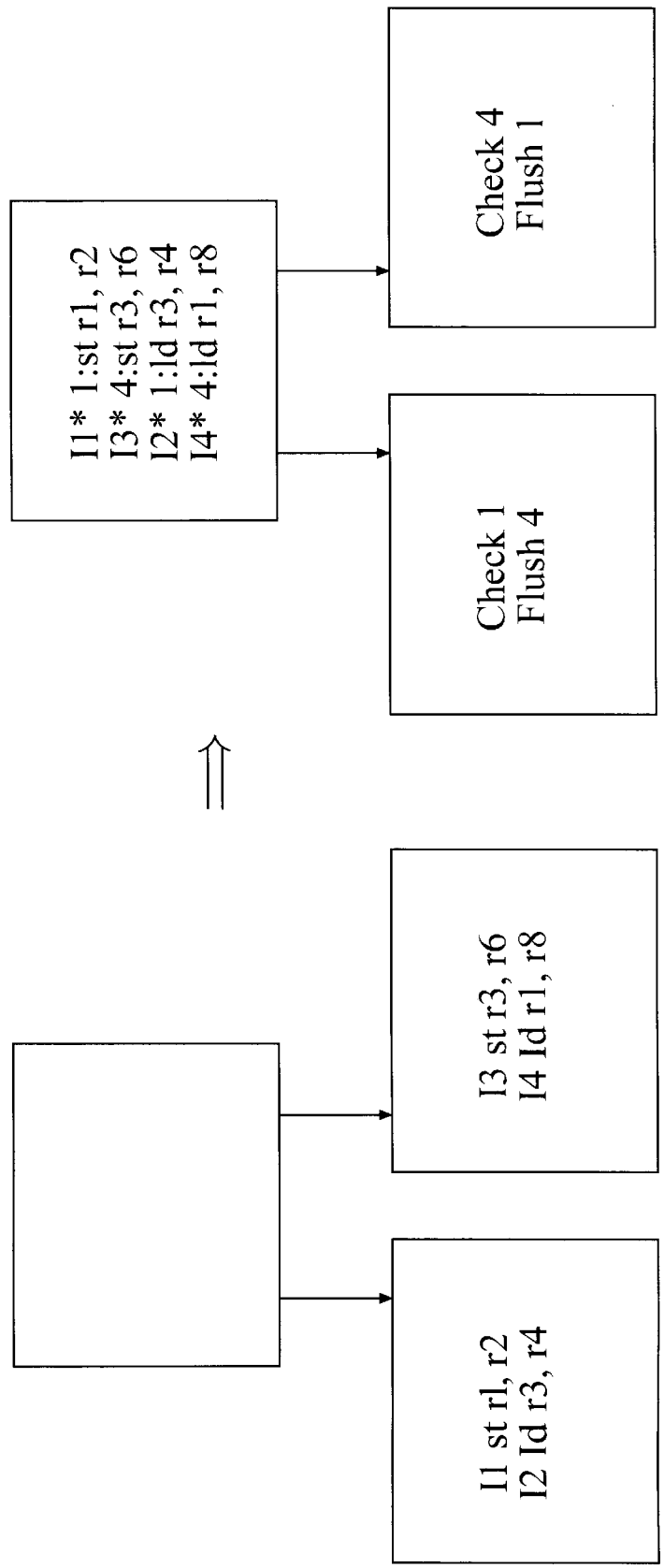
FIG. 12 depicts a sequence representing speculation of loads with path masks.

Each speculative load contains a set of tags, called the path mask. It defines the tags of the speculative stores that are visible to load. The shadow write buffer 24 is modified, so that it searches for an address match among the stores having tags that are in the path mask, step 182. If none is found, the load is issued to the rest of the memory hierarchy, step 184. Otherwise, the value written by the last matching store is returned, step 186. Applying this technique to the example results in the code shown in FIG. 12.

This approach requires that the same tag not be used for both an on-path and an off-path store. In a typical case, where all instructions with the same tag originally belonged to the same basic block, this is not possible.

It may also not be possible, because of instruction word bit constraints, to specify the path mask in each load instruction. Instead, it may be necessary to use a separate instruction which sets up a path mask on each path. This instruction would be: path. The path instruction has a tag T and a set of tags as inputs. It uses the tag set as the path mask for all speculative loads with the tag T. Associating the path mask with the tag (instead of with each load instruction) creates opportunities for other applications.

One possible application of the path mask, when the tag mask specifies a path rather than a DAG, is to extend the no-op rule, so that a speculative instruction with tag T is squashed, if some instruction having a tag in the path mask of T should have trapped. This allows the registers to be reused in the following circumstance. A register that is written to speculatively by tag T, and which is read by speculative instructions with tags $T_1, \ldots, T_n$ can be overwritten by a speculative instruction having a path mask containing all of $T, T_1, \ldots, T_n$.

In conclusion, the method of the present invention includes the steps of:

a) generating at least one assumption;

b) identifying the assumption with a tag;

c) attaching the tag to all instructions in each of the assumptions;

d) adding a flushing instruction at a negative decision point or modifying certain instructions to achieve the same end;

e) optimizing information representative of decision points within each of the assumptions;

f) adding a check or check instruction at a positive decision point or modifying certain instructions to achieve the same end; and i) flushing the effects of all of the tagged instructions when at least one of the assumptions is determined to be false; or ii) checkpointing the effects of all of the tagged instructions when all of the assumptions is determined to be true and no instruction trapped.

In addition, the system is adapted to detect traps quickly and efficiently. This is facilitated by the ability to convert instructions to no-op instructions. Further, the system can quickly and efficiently restart after trap detection and recovery.

The system also allows store and load instructions to be modified in a manner that enables static speculation, selective discarding of stores, and multiple path speculation. Alternatively, the same ends can be achieved by specifying the information in a separate path instruction, via a path mask.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A method for implementing speculative instructions in computing systems, the steps comprising:

a) generating at least one speculative flow sequence;

b) identifying each of said at least one speculative flow sequence with its own tag;

c) attaching said tag associated with each of said at least one speculative flow sequence to all instructions in each of said at least one speculative flow sequence; and d) flushing the effects of said all instructions associated with said tag in each of said at least one speculative flow sequence at a negative decision point, so that speculative instructions are handled as if they had been executed non-speculatively.

2. The method for implementing speculative instructions in accordance with claim 1, the steps further comprising:

e) checkpointing the effects of said all instructions associated with said tag in each of said at least one speculative flow sequence at a positive decision point.

3. The method for implementing speculative instructions in accordance with claim 2, wherein said at least one speculative flow sequence comprises at least two decision points.

4. The method for implementing speculative instructions in accordance with claim 1, the steps further comprising:

e) determining whether a trap occurred during said speculative flow sequence; and f) generating a precise interrupt when a trap is detected.

5. The method for implementing precise interrupts for computing systems with speculative instructions in accordance with claim 4, wherein said precise interrupts are reported without further execution.

6. The method for implementing precise interrupts for computing systems with speculative instructions in accordance with claim 4, wherein said precise interrupts are implemented during compiling.

7. The method for implementing speculative instructions in accordance with claim 4, the steps further comprising:

g re-executing certain instructions from said trap and restarting the instructions in the trap from other speculative flow sequences to recover from said trap.

* * * * *